Figure 3:
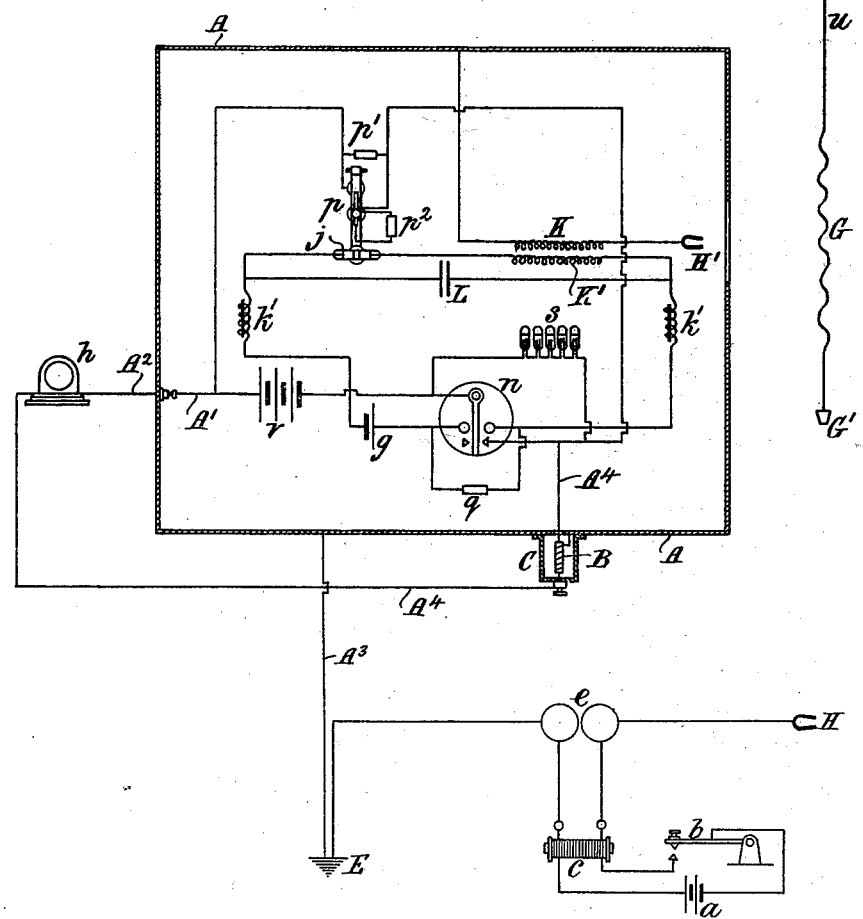

No. 624,516. Patented May 9, 1899.
G. MARCONI.
APPARATUS EMPLOYED IN WIRELESS TELEGRAPHY.
(Application filed Jan. 5, 1899.)
(No Model.) 2 Sheets—Sheet 1.
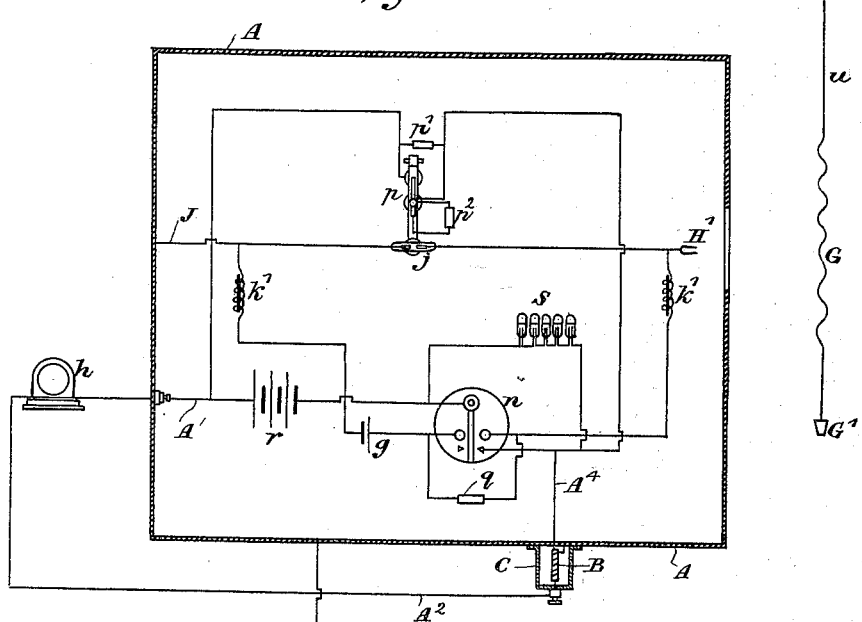
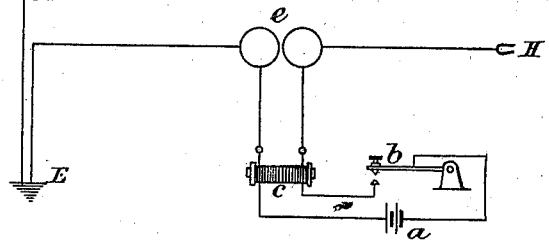
Witnesses.
A. M. Parkins
E. A. Balloch
Inventor.
Guglielmo Marconi,
By his Attorneys,
Baldwin Davidson Wight
THE NORRIS PETERS CO., PHOTO-LITHO., WASHINGTON, D. C.

No. 624,516. Patented May 9, 1899.
G. MARCONI.
APPARATUS EMPLOYED IN WIRELESS TELEGRAPHY.
(Application filed Jan. 5, 1899.)

(No Model.) 2 Sheets—Sheet 2.

Witnesses. Inventor
Guglielmo Marconi
by his Attorneys
Baldwin, Davidson & Wight

UNITED STATES PATENT OFFICE.

GUGLIELMO MARCONI, OF LONDON, ENGLAND, ASSIGNOR TO THE WIRELESS TELEGRAPH AND SIGNAL COMPANY, LIMITED, OF SAME PLACE.

APPARATUS EMPLOYED IN WIRELESS TELEGRAPHY.

SPECIFICATION forming part of Letters Patent No. 624,516, dated May 9, 1899.

Application filed January 5, 1899. Serial No. 701,250. (No model.)

*To all whom it may concern:*

Be it known that I, GUGLIELMO MARCONI, electrician, a subject of the King of Italy, residing at 28 Mark Lane, in the city of London, England, have invented certain new and useful Improvements in Apparatus Employed in Wireless Telegraphy, of which the following is a specification.

In the specification of a former patent granted to me, No. 586,193, I described an arrangement in which the transmitter consisted of a sparking appliance having one terminal connected to an insulated conductor in the air and the other terminal to earth, while the receiver contained a sensitive tube or sensitive imperfect contact having one end connected to a similar conductor and the other end to earth. When both instruments are employed at the same station, it is found that the sensitive tube or sensitive imperfect contact is liable to injury by its close proximity to the sparking appliance. In order to obviate this objection, I inclose the receiver containing the sensitive tube or sensitive imperfect contact in a box of metal having only a small opening into it, and I employ the same conductor and earth-plate for both instruments. The earth-plate is permanently connected to one terminal of the sparking appliance and to the outside of the box. The insulated conductor can be connected by a plug either to the other terminal of the sparking appliance or to the other end of the imperfect contact. Where a recording instrument is employed, this cannot conveniently be placed inside the box, and in order to prevent the wires connecting it to the relay of the receiver from leading injurious oscillations to the sensitive tube I adopt the following arrangement: One terminal of the relay-circuit is connected to the inside of the box and one terminal of the recording instrument to the outside. The ends of the wires from the other terminals of the relay-circuit and recording instrument are connected to the ends of a coil formed from an insulated wire covered with tin-foil. This coil is outside the box, and the tin-foil is in electrical communication with it.

Figure 1 is a diagram of a combined transmitting and receiving station arranged in accordance with this invention. Fig. 2 shows the wire of which the coil B is made. Fig. 3 is a diagram similar to Fig. 1, showing a modification.

The letters, so far as they are applicable, are the same as those employed in the former specification.

$a$ is a battery, and $b$ an ordinary Morse key closing the circuit through the primary of a Ruhmkorff coil $c$, the terminals of the secondary being connected to metallic balls $e$. $g$ is a battery, and $h$ a telegraphic instrument on the derived circuit of a relay $n$. $j$ is a glass tube containing metallic powder. $k'$ are choking-coils in the circuit through the tube. $p$ is a trembler on the relay-circuit for tapping the tube. $q$ is a resistance-coil. $r$ is a battery in the relay-circuit. $p'$ is a resistance inserted in derivation across the terminals of the trembler $p$, and $p^2$ is a resistance in a circuit connecting the vibrating contacts of the trembler. $s$ is a resistance across the terminals of the relay-circuit. $u$ is an aerial conductor. These arrangements are now well known and are fully described in my former specification.

According to my present invention I inclose the receiver in a metallic box A. One-twentieth of an inch is a suitable thickness for the metal. The inside of the box is connected by a wire A' to the relay-circuit and its outside by wires $A^2$ $A^3$ to one terminal of the telegraphic instrument $h$ and earth E, respectively. The other branch of the relay-circuit is connected by a wire $A^4$, insulated from the box, to the other terminal of the instrument $h$.

B is a coil on the wire $A^4$ and outside the box. It is protected from mechanical injury by a wooden case C; but this may be omitted. The coil B may contain about twenty yards of wire one seventy-fifth of an inch in diameter and have one hundred and twenty turns. The wire is insulated with gutta-percha D, which is covered with tin-foil F, as shown in Fig. 2. The tin-foil is in electric connection with the box. The coil B prevents oscillations of the transmitter from reaching the coherer at the same station through the wire $A^4$. The aerial conductor $u$ can be connected by a flexible conductor, plug G', and spring-contacts H and H' either to one of the balls $e$ for transmitting or to one end of the tube $j$ for receiving. The other end of the tube $j$ is connected by a wire J to the inside of the box.

The aerial conductor need not be insulated, as shown, but may be connected to earth through the primary of an induction-coil, the ends of the secondary of which are connected to the terminals of the receiver. This arrangement is shown in Fig. 3. The contact H', in place of being connected to the end of the tube $j$, is connected to the inside of the box through the primary K of an induction-coil, while the two ends of the tube $j$ are connected to the secondary K' of the coil. L is a condenser in a shunt across the wire leading from the tube $j$ to the coils $k'$. In other respects the arrangement is the same as that shown in Fig. 1, and the parts are marked with the same letters.

What I claim is—

1. The combination of a transmitter, a receiver, an aerial conductor, a metallic box containing the receiver, earth connections to one terminal of the transmitter and to the box, an interchangeable connection from the aerial conductor either to the other terminal of the transmitter or to one terminal of the receiver and a connection between the other terminal of the receiver and the box.

2. The combination of a transmitter, a receiver, an aerial conductor, a metallic box containing the receiver, earth connections to one terminal of the transmitter and to the box, an interchangeable connection from the aerial conductor either to the other terminal of the transmitter or to one terminal of the receiver, a connection between the other terminal of the receiver and the box, a relay operated by the receiver, a telegraph instrument outside the box, a connection between the box and one terminal of the relay, a connection between the box and one terminal of the telegraph instrument and a connection insulated from the box between the other terminals of the relay and telegraph instrument.

3. The combination of a transmitter, a receiver, an aerial conductor, a metallic box containing the receiver, earth connections to one terminal of the transmitter and to the box, an interchangeable connection from the aerial conductor either to the other terminal of the transmitter or to one terminal of the receiver, a connection between the other terminal of the receiver and the box, a relay operated by the receiver, a telegraph instrument outside the box, a connection between the box and one terminal of the relay, a connection between the box and one terminal of the telegraph instrument, a connection insulated from the box between the other terminals of the relay and telegraph instrument, a coil of insulated wire outside the box in the latter connection and a metallic covering to the insulation in connection with the box.

GUGLIELMO MARCONI.

Witnesses:
ROBERT B. RANSFORD,
JOHN H. WHITEHEAD.